United States Patent
Krupka et al.

(10) Patent No.: US 9,165,180 B2
(45) Date of Patent: Oct. 20, 2015

(54) ILLUMINATION SENSITIVE FACE RECOGNITION

(71) Applicant: Microsoft Corporation, Redmond, WA (US)

(72) Inventors: Eyal Krupka, Shimshit (IL); Tommer Leyvand, Seattle, WA (US); Igor Kviatkovsky, Haifa (IL); Igor Abramovski, Haifa (IL); Tim Keosababian, Redmond, WA (US); Jinyu Li, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 565 days.

(21) Appl. No.: 13/651,300

(22) Filed: Oct. 12, 2012

(65) Prior Publication Data

US 2014/0105504 A1  Apr. 17, 2014

(51) Int. Cl.
  *G06K 9/00* (2006.01)
  *G06K 9/46* (2006.01)
  *G06T 5/00* (2006.01)

(52) U.S. Cl.
  CPC .......... *G06K 9/00228* (2013.01); *G06K 9/4661* (2013.01); *G06T 5/002* (2013.01)

(58) Field of Classification Search
  None
  See application file for complete search history.

(56) References Cited

U.S. PATENT DOCUMENTS

| | | | |
|---|---|---|---|
| 7,630,526 B2 | 12/2009 | Bober et al. | |
| 7,734,087 B2 | 6/2010 | Hwang et al. | |
| 2007/0065015 A1* | 3/2007 | Nishiyama et al. | 382/190 |
| 2007/0070214 A1* | 3/2007 | Nakamura | 348/222.1 |
| 2008/0107311 A1 | 5/2008 | Huang et al. | |
| 2008/0166026 A1 | 7/2008 | Huang et al. | |
| 2014/0169643 A1* | 6/2014 | Todoroki | 382/118 |

FOREIGN PATENT DOCUMENTS

WO  2011055164 A1  5/2011

OTHER PUBLICATIONS

Liu, Dang-Hui et al., "Illumination Invariant Face Recognition", Journal of the Pattern Recognition Society, vol. 38, Issue 10, Oct. 2005, pp. 1705-1716.
ISA European Patent Office, International Search Report & Written Opinion for PCT Patent Application No. PCT/US2013/064420, Dec. 17, 2013, 11 Pages.

(Continued)

*Primary Examiner* — Barry Drennan
(74) *Attorney, Agent, or Firm* — Bryan Webster; Kate Drakos; Micky Minhas

(57) ABSTRACT

Systems and methods for face recognition are provided. In one example, a method for face recognition includes receiving a user image and detecting a user luminance of data representing the user's face. An adaptive low pass filter is selected that corresponds to the user luminance of the user's face. The filter is applied to the user image to create a filtered user image. The filtered user image is projected to create a filtered user image representation. A filtered reference image representation that has been filtered with the same low pass filter is selected from a reference image database. The method then determines whether the filtered reference image representation matches the filtered user image representation.

19 Claims, 8 Drawing Sheets

| LUMINANCE | EXAMPLE FILTER SIZE |
|---|---|
| RL > T2 | NO FILTER |
| T1 < RL ≤ T2 | 2 X 2 BLOCK AVERAGING FILTER |
| RL ≤ T1 | 3 X 3 BLOCK AVERAGING FILTER |

(56) References Cited

OTHER PUBLICATIONS

Kato, et al., "A Real-time Angle and illumination Aware Face Recognition System Based on Artificial Neural Network", Retrieved at <<http://www.google.co.in/url?sa=t&rct=j&q=illumination%20aware%20face%20recognition&source=web&cd=1&ved=0CFMQFjAA&url=http%3A%2F%2Fwww.hindawi.com%2Fjournals%2Facisc%2Faip%2F274617.pdf&ei=97fqT-vmFYKGrAe815y5BQ&usg=AFQjCNFHQhg6NWQCzR2PDqLlebfd7gDi6A>>, Retrieved Date: Jun. 27, 2012, pp. 9.

Han, et al., "Lighting Aware Preprocessing for Face Recognition across Varying Illumination", Retrieved at <<http://www.jdl.ac.cn/doc/2010/ECCV10-hhan-FinalPrint.pdf>>, Proceedings of 11th European Conference on Computer Vision (ECCV), vol. 6312, Part II, Sep. 5, 2010, pp. 14.

Liu, et al., "Gabor Feature Based Classification Using the Enhanced Fisher Linear Discriminant Model for Face Recognition", Retrieved at <<http://citeseerx.ist.psu.edu/viewdoc/download?doi=10.1.1.1.7675&rep=rep1&type=pdf>>, Proceedings of IEEE Transaction on Image Processing, vol. 11, No. 4, Apr. 2002, pp. 36.

Zheng, et al., "GA-Fisher: A New LDA-Based Face Recognition Algorithm with Selection of Principal Components", Retrieved at <<http://ieeexplore.ieee.org/stamp/stamp.jsp?tp=&arnumber=1510780>>, Proceedings of IEEE Transactions on Systems, Man, and Cybernetics—Part B: Cybernetics, vol. 35, No. 5, Oct. 2005, pp. 14.

\* cited by examiner

| LUMINANCE | EXAMPLE FILTER SIZE |
|---|---|
| RL > T2 | NO FILTER |
| T1 < RL ≤ T2 | 2 X 2 BLOCK AVERAGING FILTER |
| RL ≤ T1 | 3 X 3 BLOCK AVERAGING FILTER |

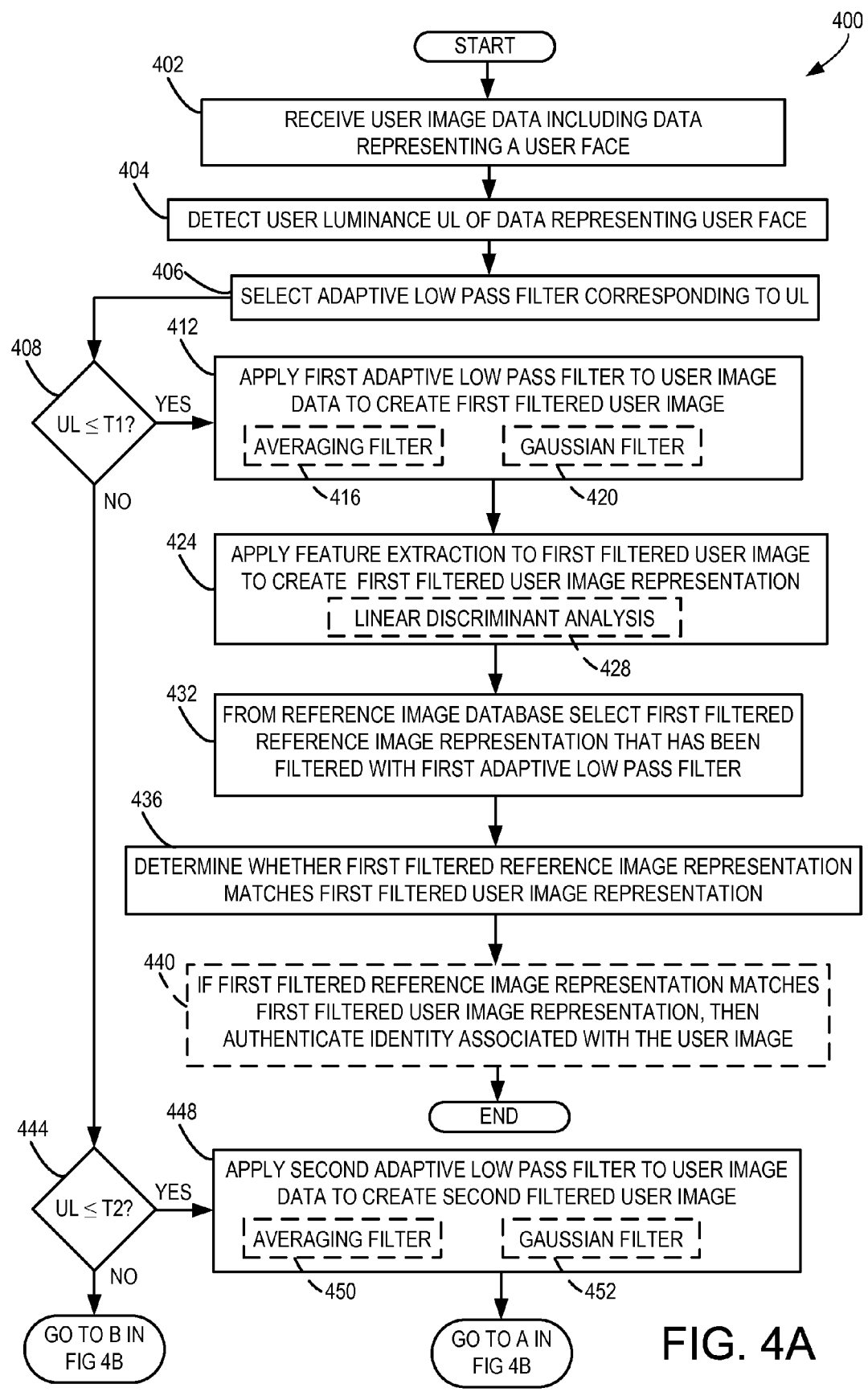

ILLUMINATION SENSITIVE FACE RECOGNITION

BACKGROUND

Face recognition technology may be utilized to identify a person in various applications and contexts. Such applications and contexts may include, for example, computing systems using natural user interfaces, security systems, identity authentication systems, and the like. When used in these different applications and/or contexts, a face recognition system may encounter varying illumination conditions that pose challenges to the accuracy and reliability of the system. In one example, imaging sensors that capture facial image data may generate increasing noise as the illumination of the subject face decreases. As a result, in low illumination conditions the sensors may produce a lower quality image that may cause inaccurate results and inconsistent performance of the face recognition system.

In some prior approaches, noise reduction filters have been employed to reduce the amount of noise in the image prior to applying the face recognition technology. These approaches, however, typically set the filter parameters without regard to illumination conditions present when the image was captured. As a result, depending upon the illumination conditions, the filter may "over-correct" the region of interest removing small details, or "under-correct" the region of interest leaving the undesirable noise.

In other approaches, the direction of illumination incident on the subject face and/or the pattern of illumination that is present when the image is captured may be estimated. Such data may be used to preprocess the image prior to applying a face recognition application. These approaches, however, involve gathering and processing a significant amount of information, and are therefore computationally demanding and expensive.

SUMMARY

To address the above issues, methods and systems for face recognition are provided. In one example, a method for generating a reference image for face recognition is provided. The method may include receiving reference image data including data representing a reference face, and detecting a reference luminance of the data representing the reference face. If the reference luminance is less than or equal to a first luminance threshold, then the method may include applying a first adaptive low pass filter to the reference image data to create a first filtered reference image. If the reference luminance is greater than the first luminance threshold and less than or equal to a second luminance threshold, then the method may include applying a second adaptive low pass filter to the reference image data to create a second filtered reference image, and applying the first adaptive low pass filter to the reference image data to create the first filtered reference image.

In another example, a method for face recognition may include receiving a user image including data representing a user face and detecting a user luminance of the data representing the user face. The method may include selecting an adaptive low pass filter that corresponds to the user luminance of the user face. The method may then apply the adaptive low pass filter to the user image data to create a filtered user image. The method may include applying feature extraction to the filtered user image to create a filtered user image representation.

The method may include selecting a filtered reference image representation from a reference image database containing a plurality of filtered reference image representations. The filtered reference image representation may comprise a reference image that has been filtered with the adaptive low pass filter. The method may then include determining whether the filtered reference image representation matches the filtered user image representation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A, 4B and 4C are a flow diagram illustrating a method for face recognition according to one embodiment of the present disclosure.

DETAILED DESCRIPTION

Figure 1:
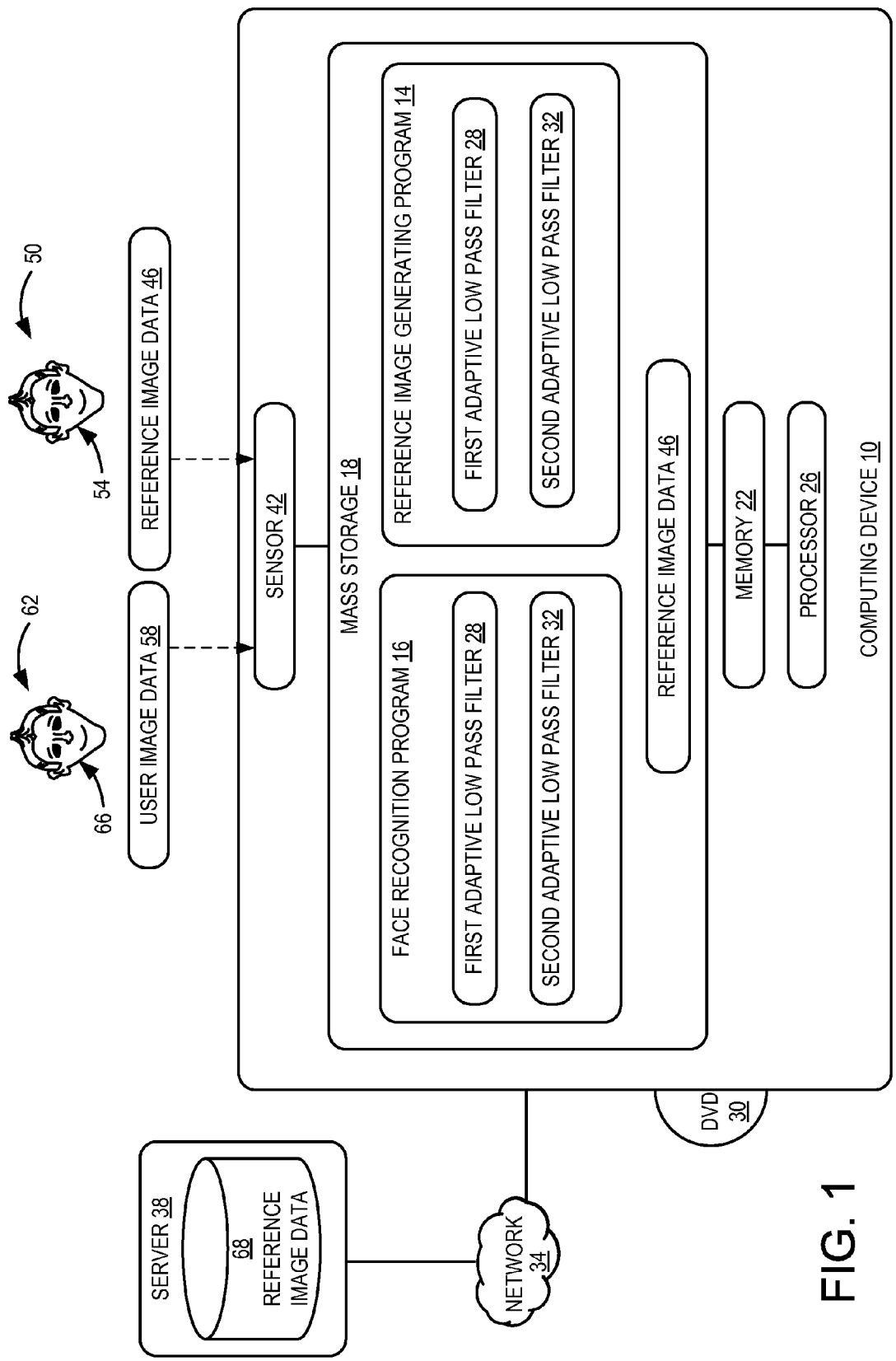
FIG. 1 is a schematic view of a computing device capable of face recognition according to an embodiment of the present disclosure.

FIG. 1 is a schematic illustration of a computing device 10 according to an embodiment of the present disclosure. As explained in more detail below, the computing device 10 may be used to perform methods for generating one or more reference images that may be used to perform face recognition. The computing device 10 may also be used to perform methods for face recognition that are described in more detail below. It will also be appreciated that in other examples, separate computing devices having the same or similar components and computing aspects as computing device 10 may be used to perform the methods for generating one or more reference images described below, and to perform the face recognition methods described below.

Computing device 10 may take the form of a gaming console, desktop computer, laptop computer, tablet computing, mobile computer, networking computer, set-top box (e.g. cable television box, satellite television box), or any other type of suitable computing device. Additional details regarding the components and computing aspects of the computing device 10 are described in more detail below with respect to FIG. 6.

The computing device 10 may include a reference image generating program 14 that may be stored in mass storage 18 of the computing device. The reference image generating program 14 may be loaded into memory 22 and executed by a processor 26 of the computing device 10 to perform one or more of the methods and processes for generating a reference image described in more detail below. The computing device 10 may also include a face recognition program 16 that may be stored in mass storage 18 of the computing device. The face recognition program 16 may be loaded into memory 22 and executed by a processor 26 of the computing device 10 to perform one or more of the methods and processes for face recognition described in more detail below.

The reference image generating program 14 and face recognition program 16 may also include one or more adaptive low pass filters, such as a first adaptive low pass filter 28 and a second adaptive low pass filter 32. As described in more detail below, the reference image generating program 14 may use the one or more adaptive low pass filters to create filtered reference images and corresponding filtered reference image representations. Similarly, the face recognition program 16 may use the one or more adaptive low pass filters to create filtered user images and corresponding filtered user image representations that may be compared to one or more filtered reference image representations.

The adaptive low pass filters may take a variety of forms including, but not limited to, averaging filters, such as box averaging filters, Gaussian filters, etc. It will be appreciated that any filter or approximating function suitable for reducing an amount of intensity variation between neighboring pixels in an image, and retaining patterns in the image while reducing noise in the image, may be utilized.

The adaptive low pass filters include at least one filter parameter that may vary with the illumination of a subject's face at the time image data of the face is captured. For example, where an adaptive low pass filter comprises an averaging filter, the filter may include a kernel that may vary with the illumination of the face at the time the image data is captured. For a box averaging filter, the kernel may correspond to a size of the pixel neighborhood that is sampled when determining the average.

In one example, such pixel neighborhood size may increase as the illumination decreases, and decrease and the illumination increases. It will be appreciated that in this manner, the attenuation of the image data may increase as the illumination decreases and the pixel neighborhood size correspondingly increases. For example, and as explained in more detail below, a first adaptive low pass filter may include a first kernel that represents a first box pixel neighborhood and provides a first attenuation. A second adaptive low pass filter may include a second kernel that represents a second box pixel neighborhood and provides a second attenuation. In this example, the first box pixel neighborhood is larger than a second box pixel neighborhood.

In other examples, where an adaptive low pass filter comprises a Gaussian filter, the filter may include a kernel that may vary with the illumination of the face at the time the image data is captured. In these examples, the kernel may correspond to a width of the Gaussian filter. In one example, such filter width may increase as the illumination decreases, and decrease as the illumination increases. In this manner, the attenuation of the image data may increase as the illumination decreases and the filter width correspondingly increases.

It will also be appreciated that the one or more adaptive low pass filters may be implemented in a variety of manners. Any suitable implementation of the adaptive low pass filters may be utilized.

In some examples the reference image generating program 14 and/or face recognition program 16 may be received by the computing device 10 from removable computer-readable storage media 30, shown here in the form of a DVD. The removable computer-readable storage media 30 may also take the form of CDs, HD-DVDs, Blu-Ray Discs, EEPROMs, and/or floppy disks, among others. In other examples, the reference image generating program 14 and/or face recognition program 16 may be received from a remote source via a network, such as network 34. Network 34 may take the form of a local area network (LAN), wide area network (WAN), wired network, wireless network, personal area network, or a combination thereof, and may include the Internet. The computing device 10 also may be operatively connected with one or more additional devices, such as server 38, via network 34.

Figures 2, 5:
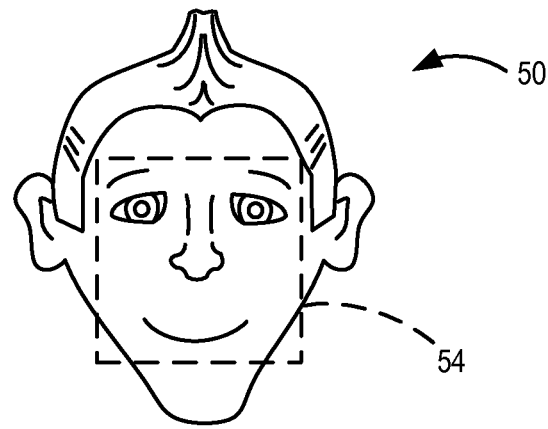
FIG. 2 is a schematic view of a reference image including a face.
FIG. 5 is a table showing one example of mapping a detected luminance to an adaptive low pass filter.

The computing device 10 may include a sensor 42 for capturing image data from a subject, with the image data including data representing a face of the subject. FIG. 2 schematically illustrates one example of a reference subject 50 having a reference face 54. In one example the reference image data 46 received by sensor 42 includes data representing the reference face 54. It will be appreciated that the data representing the reference face 54 may also include more or fewer features of the face and/or head of the reference subject 50 than shown in the example reference face 54. Additional features may include, for example, ears, chin, forehead, hairline, etc.

In one example, the sensor 42 may also capture user image data 58 from a user, such as user 62, with the user image data including data representing a user face 66 of the user. In some examples, the reference subject 50 may be the same person as the user 62, while in other examples the reference subject may be a different person from the user 62. As discussed in more detail below, it will also be appreciated that the reference image data 46 and user image data 58 may vary based on the illumination conditions present when the image data is captured.

The sensor 42 may be integrated into the computing device 10 as shown in FIG. 1, or may be separate from the computing device. The sensor 42 may comprise, for example, a video camera that records color image data such as red-green-blue (RGB) image data and/or monochrome image data such as infrared (IR) image data. For purposes of this description, the sensor 42 will be described as a color video camera that captures RBG image data.

In some examples, reference image data 46 may be received by computing device 10 from other sources such as, for example, DVD 30 or a remote reference image database 68 located on server 38. Reference image data 46 may also be stored in mass storage 18 on computing device 10.

Figure 3A:
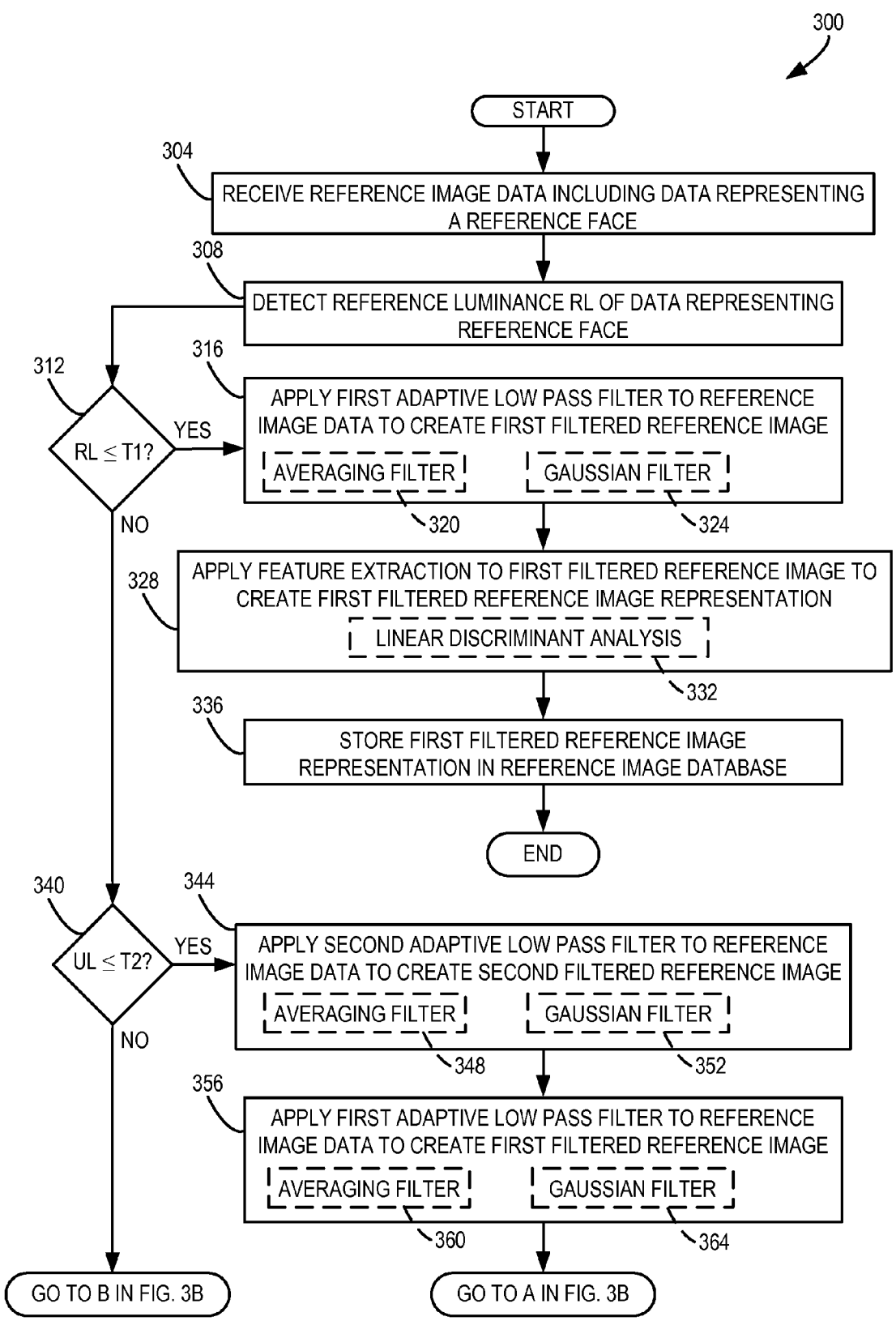
FIGS. 3A and 3B are a flow diagram illustrating a method for generating a reference image for face recognition according to one embodiment of the present disclosure.
Figure 3B:
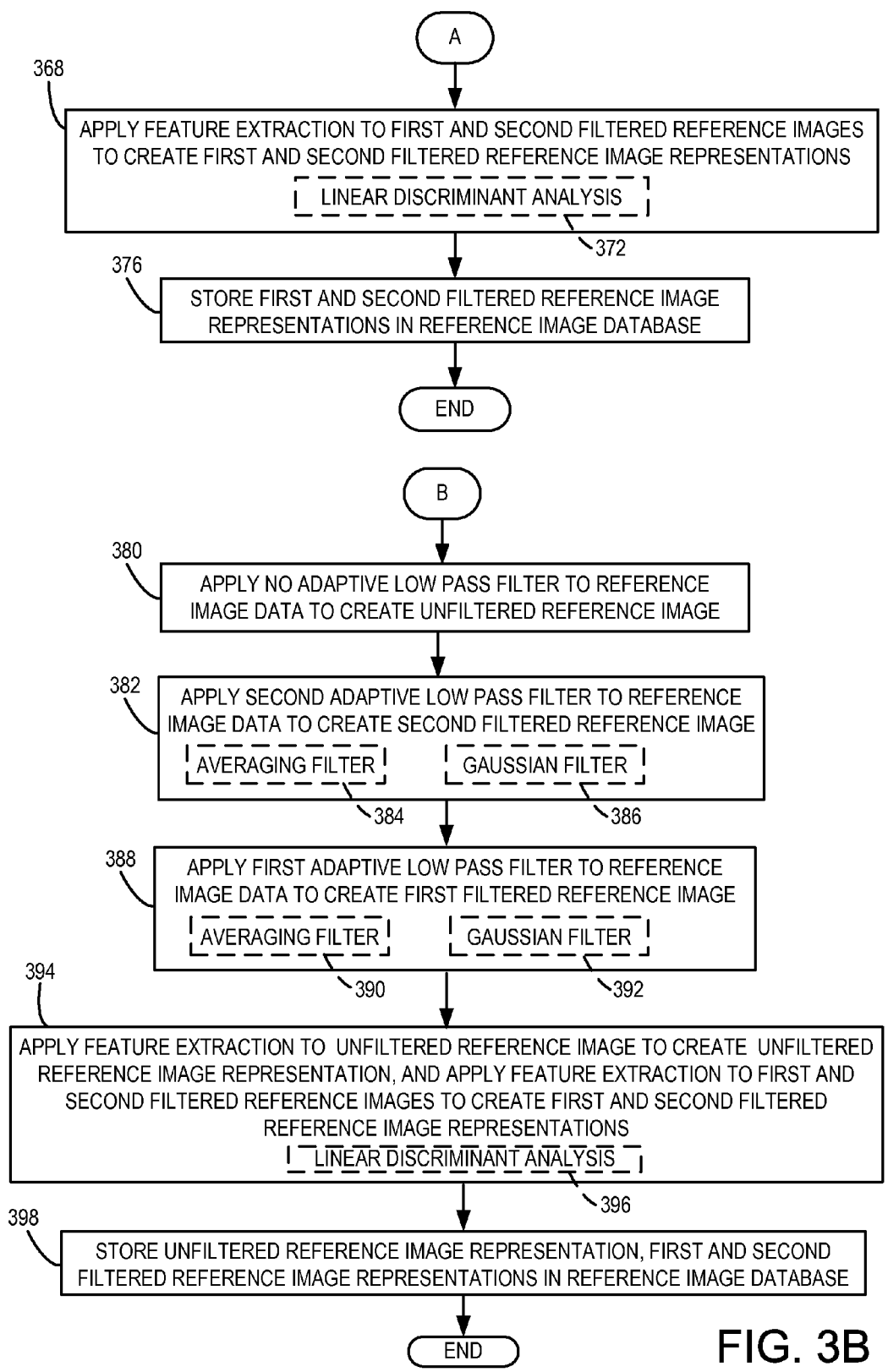

Turning now to FIGS. 3A and 3B, an embodiment of a method 300 for generating a reference image for face recognition will now be described. The method 300 may be performed using the hardware and software components of the computing device 10 described above, or using any other suitable components.

At 304 the method 300 may include receiving reference image data 46 including data representing a reference face 54. As noted above, reference image data 46 may be captured by the sensor 42 under a variety of illumination conditions. Such illumination conditions may include, for example, luminance, the number of light sources, and the locations of light sources. In the present example, one aspect of the illumination conditions may be characterized by a reference luminance RL that is received from the reference face 54 of the reference subject 50. Alternatively expressed, one aspect of the illumination conditions may be characterized as an amount of light that is emitted from the reference face 54 and correspondingly represented in the data representing the reference face.

It will be appreciated that various techniques may be utilized to measure the reference luminance RL of the reference face 54. In some examples, facial mapping technologies may be used to define an area of the reference face, such as the box associated with reference face 54 in FIG. 2. Since the reflectivity of human skin is known, the reference luminance of the reference face may then be calculated by estimating the amount of light that is emitted from the area of the reference face 54.

Returning to FIG. 3, at 308 the method 300 may include detecting a reference luminance RL of the data representing the reference face 54. At 312, if the reference luminance RL is less than or equal to a first luminance threshold T1, then at 316 the method 300 may include applying a first adaptive low pass filter 28 to the reference image data 46 to create a first filtered reference image. As noted above, in one example the first adaptive low pass filter 28 may comprise an averaging filter 320. With reference to the table illustrated in FIG. 5, in one example where reference luminance RL is less than or equal to the first luminance threshold T1, the averaging filter 320 may comprise a block averaging filter that averages a 3×3 neighborhood of pixels. In another example, the first adaptive low pass filter 28 may comprise a Gaussian filter 324.

Once the first adaptive low pass filter 28 has been applied to the reference image data 46, at 328 the method 300 may include applying feature extraction to the first filtered reference image to create a first filtered reference image representation. In one example, linear discriminant analysis (LDA) 332 may be used for dimensionality reduction to create the first filtered reference image representation. It will be appreciated that any other suitable feature extraction technique (such as local binary patterns (LBP), scale-invariant feature transform (SIFT), etc.) together with any suitable pattern recognition and/or classification analyses (such as principal component analysis (PCA), independent component analysis (ICA), etc.) may also be utilized to represent the reference image as a combination of features that characterize facial images of a person, and to separate them from facial images of other people.

At 336 the method 300 may include storing the first filtered reference image representation in a reference image database such as, for example, in the mass storage 18 of computing device 10 or in the remote reference image database 68 on server 38. After storing the first filtered reference image representation the method 300 may end.

Returning to 312, if the reference luminance RL is not less than or equal to the first luminance threshold T1, then at 340 the method 300 may include determining if the reference luminance RL is less than or equal to a second luminance threshold T2 that is greater than T1. If the reference luminance RL is less than or equal to the second luminance threshold T2, then at 344 the method 300 may include applying a second adaptive low pass filter 32 to the reference image data 46 to create a second filtered reference image. As noted above, in one example the second adaptive low pass filter 32 may comprise an averaging filter 348. With reference also to the table illustrated in FIG. 5, in one example where reference luminance RL is greater than the first luminance threshold T1 and less than or equal to the second luminance threshold T2, the averaging filter 348 may comprise a block averaging filter that averages a 2×2 neighborhood of pixels. In another example, the second adaptive low pass filter 32 may comprise a Gaussian filter 352.

At 356 the method 300 may also include applying the first adaptive low pass filter 28 to the reference image data 46 to create the first filtered reference image. As noted above, in one example the first adaptive low pass filter 28 may comprise an averaging filter 360. In another example, the first adaptive low pass filter 28 may comprise a Gaussian filter 364.

Advantageously, and as explained in more detail below, when the reference luminance RL is greater than the first luminance threshold T1 and less than or equal to the second luminance threshold T2, the reference image generating program 14 may create both a first filtered reference image and a second filtered reference image. Because the first adaptive low pass filter 28 attenuates the reference image data 46 to a greater degree than the second adaptive low pass filter 32, the higher noise level in the reference image data 46 captured at a lower illumination (at or below T1) will be attenuated to a greater degree than the lower noise level in the data captured at a higher illumination (above T1 and at or below T2). Expressed in another manner, the first adaptive low pass filter 28 may provide a first attenuation of the reference image data using a first cutoff frequency. The second adaptive low pass filter may provide a second attenuation of the reference image data using a second cutoff frequency that is higher than the first cutoff frequency.

Furthermore, as explained in more detail below, in some examples these multiple filtered reference images may be matched to a filtered runtime user image according to the particular low pass filter applied to the runtime user image. Alternatively expressed, a runtime user image that is filtered with a particular low pass filter may be compared to a reference image that has been filtered using the same low pass filter. Advantageously, by comparing a reference image and a user image that are both filtered using the same low pass filter, improved face recognition accuracy and consistency may be achieved.

Furthermore, in some examples the face recognition program 16 may provide such a comparison even where the illumination conditions existing when the reference image was captured differ substantially from the illumination conditions existing at the moment the user image is captured. Alternatively expressed, in some examples the face recognition program 16 may provide such a comparison where the reference luminance of the reference image differs substantially from a user luminance of a user image.

Turning now to FIG. 3B, at 368 the method 300 may include applying feature extraction to the first and second filtered reference images to create first and second filtered reference image representations. As noted above, in one example LDA 372 may be used for dimensionality reduction to create the first filtered reference image representation and the second filtered reference image representation.

At 376 the method 300 may include storing the first and second filtered reference image representations in a reference image database such as, for example, in the mass storage 18 of computing device 10 or in the remote reference image database 68 on server 38. After storing the first and second filtered reference image representations the method 300 may end.

Referring also to FIG. 3A, at 340 if the reference luminance RL is greater than the second luminance threshold T2, then at 380 the method 300 may include applying no adaptive low pass filter to the reference image data 46, thereby creating an unfiltered reference image. Alternatively expressed, if the reference luminance RL is greater than the second luminance threshold T2, then the reference image generating program 14 may not filter the reference image data 46 to remove image noise. It will be appreciated that in some examples other image processing and/or pixel manipulation techniques may be applied to the unfiltered reference image.

At 382 the method 300 may also include applying the second adaptive low pass filter 32 to the reference image data 46 to create a second filtered reference image. As noted above, in one example the second adaptive low pass filter 32 may comprise an averaging filter 384. In another example, the second adaptive low pass filter 32 may comprise a Gaussian filter 386.

At 388 the method 300 may also include applying the first adaptive low pass filter 28 to the reference image data 46 to create a first filtered reference image. As noted above, in one example the first adaptive low pass filter 28 may comprise an averaging filter 390. In another example, the first adaptive low pass filter 28 may comprise a Gaussian filter 392.

At 394 the method 300 may include applying feature extraction to the unfiltered reference image to create an unfiltered reference image representation, and applying feature extraction to the first and second filtered reference images to create first and second filtered reference image representations. As noted above, in one example LDA 396 may be used for dimensionality reduction to create the unfiltered reference image representation and the first and second filtered reference image representations. At 398 the method 300 may include storing the unfiltered reference image representation and first and second filtered reference image representations in a reference image database. After storing the unfiltered reference image representation and first and second filtered reference image representations, the method 300 may end.

The above-described example of method 300 utilizes two luminance thresholds T1 and T2 to create three ranges of luminance that each correspond to a different adaptive low pass filter or to no filter. It will be appreciated that in other examples, one, three or more luminance thresholds that correspond to two, four or more ranges of luminance, respectively, may also be used.

Figure 4B:
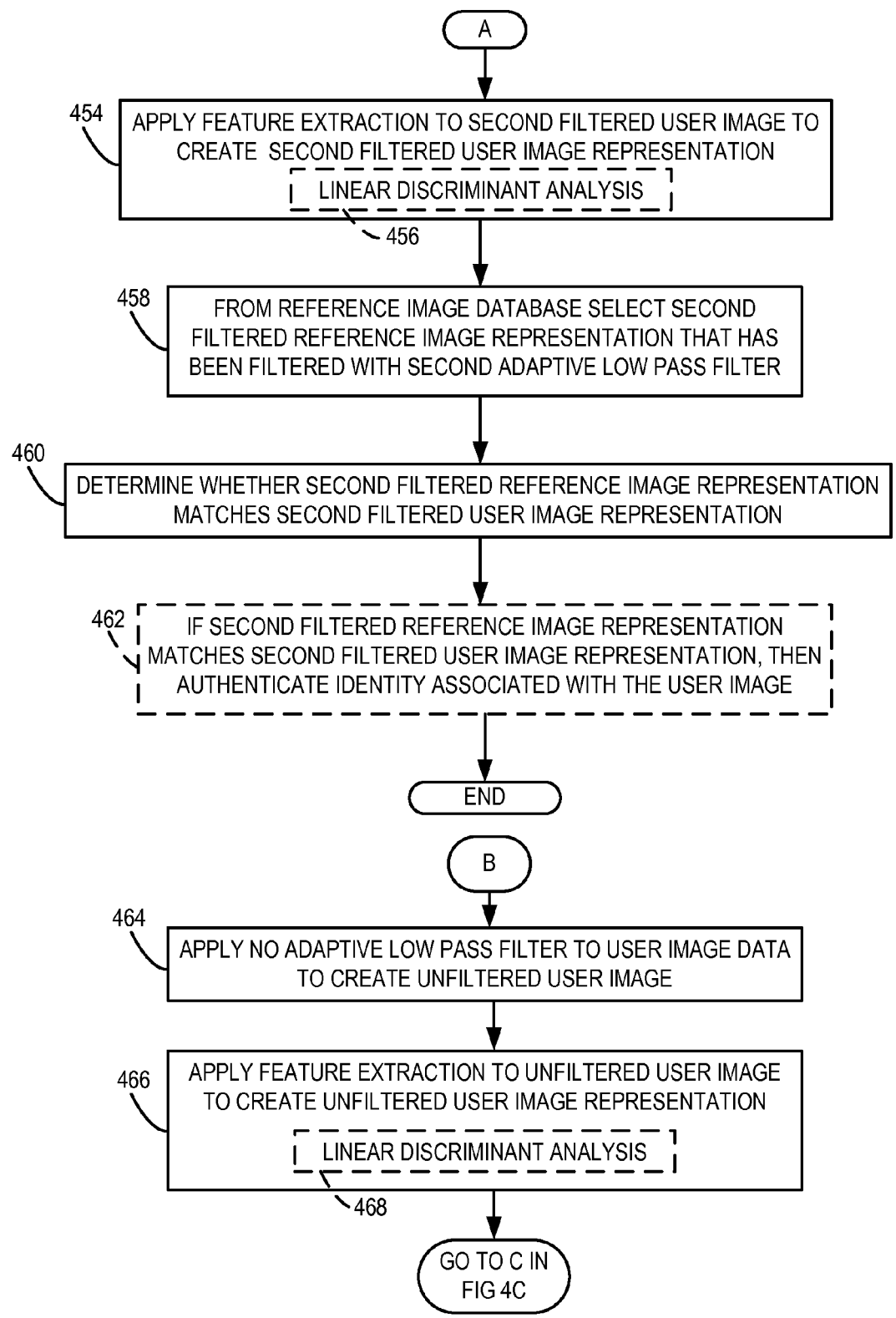
Figure 4C:
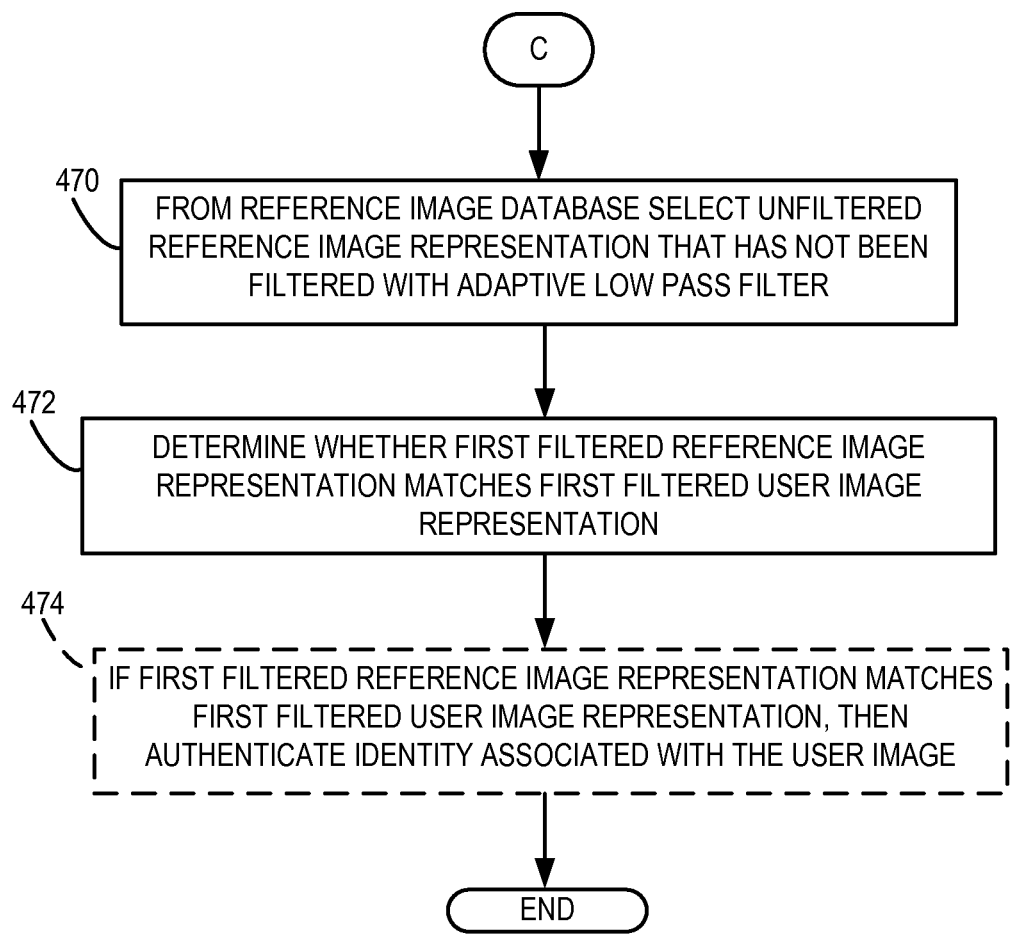

Turning now to FIGS. 4A, 4B, and 4C, an embodiment of a method 400 for face recognition will now be described. The method 400 may be performed using the hardware and software components of the computing device 10 described above, or using any other suitable components.

At 402 the method 400 may include receiving user image data 58 including data representing a user face 66. As noted above, user image data 58 may be captured by the sensor 42 under a variety of illumination conditions. In some examples, the illumination conditions may be characterized in one aspect by a user luminance UL that is received from the user face 66 of the user 62. Alternatively expressed, the illumination conditions may be characterized as an amount of light that is emitted from the user face 66.

In some examples, the user face 66 may correspond to the reference face 54 and, accordingly, the same person. It will also be appreciated that in some examples, the user image data 58 may be captured under illumination conditions that are different from the illumination conditions under which reference image data 46 was captured. More particularly, in some examples the user luminance UL of the user face 66 at a moment of user image capture may be greater than or less than the reference luminance RL of the reference face 54 at the time the reference image was captured.

Returning to FIG. 4A, at 404 the method 400 may include detecting a user luminance UL of the data representing the user face 66. At 406 the method 400 may include selecting an adaptive low pass filter that corresponds to the user luminance UL. At 408, if the user luminance UL is less than or equal to the first luminance threshold T1, then the first adaptive low pass filter 28 that provides a first attenuation of the user image data 58 may be selected. Accordingly, at 412 the method 400 may include applying the first adaptive low pass filter 28 to the user image data to create a first filtered user image.

In this example, it will be appreciated that method 400 may use the same or substantially the same luminance threshold T1 as is used in the method 300 for generating a reference image described above. In this manner, the method 400 may group user image data into user image luminance ranges that correspond to reference image luminance ranges containing reference image data. Further, user image data and reference image data from corresponding luminance ranges may be filtered using an adaptive low pass filter having substantially the same filter parameters and characteristics, such as a level of attenuation and frequency response.

As noted above, in one example the first adaptive low pass filter 28 may comprise an averaging filter 416. In one example where user luminance UL is less than or equal to the first luminance threshold T1, the averaging filter 416 may comprise a block averaging filter that averages a 3×3 neighborhood of pixels. In another example, the first adaptive low pass filter 28 may comprise a Gaussian filter 420.

At 424 the method 400 may include applying feature extraction to the first filtered user image to create a first filtered user image representation. In one example LDA 428 may be used for dimensionality reduction to create the first filtered user image representation. It will be appreciated that any other suitable pattern recognition and/or classification analyses may also be utilized for dimensionality reduction, or to otherwise identify combinations of features that characterize or separate two or more classes of data within the first filtered user image.

At 432 the method 400 may include, from a reference image database containing a plurality of filtered reference image representations, selecting a first filtered reference image representation that comprises a reference image that has been filtered with the first adaptive low pass filter 28. Advantageously, in this manner the method 400 selects a first filtered reference image representation that has been filtered with a low pass filter having substantially the same filter parameters and characteristics as the first low pass filter 28 used to create the first filtered user image.

At 436 the method 400 may include determining whether the first filtered reference image representation matches the first filtered user image representation. To determine whether the first filtered reference image representation matches the first filtered user image representation, the face recognition program 16 may use any suitable classification techniques and/or algorithms (such as, for example, nearest neighbor, support vector machines (SVM), decision trees, etc.). If the first filtered reference image representation matches the first filtered user image representation, then at 440 the method 400 may include authenticating an identity associated with the user image. The method 400 may then end.

Advantageously, in the method 400 described above the face recognition program 16 may compare a filtered user image representation and a filtered reference image representation that were each processed using the same filter. Additionally, and as explained above, given that two or more filtered reference images may be created from a single instance of reference image data, a filtered user image representation created from user image data captured at a first illumination may be compared in this manner to a filtered reference image representation created from reference image data captured at a second illumination that is different from the first.

In one example and as described above, an instance of reference image data may be captured under relatively bright light illumination conditions that create a reference luminance RL that is greater than the second luminance threshold T2. In this example, three different reference image representations may be created—an unfiltered reference image representation, a second filtered reference image representation created by applying a second adaptive low pass filter, and a first filtered reference image representation created by applying a first adaptive low pass filter.

An instance of user image data may be captured under relatively low light illumination conditions that create a user luminance UL that is less than the second luminance threshold T2 and less than the lower, first luminance threshold T1. Accordingly, only a first filtered user image representation may be created using the first adaptive low pass filter. Advantageously, in order to compare a filtered user image representation and a filtered reference image representation that were each processed using the same filter, the method 400 may select the first filtered reference image representation to compare to the first filtered user image representation. In this manner, even where the user image data is captured under illumination conditions that differ from the illumination conditions under which the reference image data was captured, the face recognition program 16 may compare a filtered user image representation and a filtered reference image representation that were each filtered using the same filter. Advantageously, this may provide for more accurate and consistent face recognition results.

Returning to 408, if the user luminance UL is not less than or equal to the first luminance threshold T1, then at 444 the method 400 may include determining if the user luminance UL is less than or equal to a second luminance threshold T2 that is greater than T1. If the user luminance UL is less than or equal to the second luminance threshold T2, then the second adaptive low pass filter 32 may be selected. It will be appreciated that the second adaptive low pass filter 32 provides a second attenuation of the user image data 58 that is greater than the first attenuation provided by the first adaptive low pass filter 28. Accordingly, at 448 the method 400 may include applying the second adaptive low pass filter 32 to the user image data 58 to create a second filtered user image. As noted above, in one example the second adaptive low pass filter 28 may comprise an averaging filter 450. In another example, the second adaptive low pass filter 28 may comprise a Gaussian filter 452.

With reference now to FIG. 4B, at 454 the method 400 may include applying feature extraction to the second filtered user image to create a second filtered user image representation. As noted above, in one example LDA 456 may be used for dimensionality reduction to create the second filtered user image representation.

At 458 the method 400 may include, from the reference image database containing a plurality of filtered reference image representations, selecting a second filtered reference image representation that comprises a reference image that has been filtered with the second adaptive low pass filter 32. As noted above, in this manner the method 400 selects a reference image representation that has been filtered with an adaptive low pass filter having substantially the same filter parameters and characteristics as the second adaptive low pass filter 32 used to create the second filtered user image.

At 460 the method 400 may include determining whether the second filtered reference image representation matches the second filtered user image representation. If the second filtered reference image representation matches the second filtered user image representation, then at 462 the method 400 may include authenticating an identity associated with the user image. The method 400 may then end.

Returning to 444, if the user luminance UL is not less than or equal to the second luminance threshold T2, then at 464 the method 400 may include applying no low pass filter to the user image data 58 to create an unfiltered user image. Alternatively expressed, if the user luminance UL is greater than the second luminance threshold T2, then the face recognition program 16 may not filter the user image data 58 to remove image noise. It will be appreciated that in some examples other image processing and/or pixel manipulation techniques may be applied to the unfiltered user image.

At 466 the method 400 may include applying feature extraction to the unfiltered user image to create an unfiltered user image representation. As noted above, in one example LDA 468 may be used for dimensionality reduction to create the unfiltered user image representation.

With reference now to FIG. 4C, at 470 the method 400 may include, from the reference image database selecting an unfiltered reference image representation that comprises a reference image that has not been filtered with an adaptive low pass filter. At 472 the method 400 may include determining whether the unfiltered reference image representation matches the unfiltered user image representation. If the unfiltered reference image representation matches the unfiltered user image representation, then at 474 the method 400 may include authenticating an identity associated with the user image. The method 400 may then end.

In another example, if no unfiltered reference image is available in the reference image database, the method 400 may apply the second adaptive low pass filter 32 to the user image data 58, and determine whether a second filtered reference image representation matches the second filtered user image representation. If a second filtered reference image is not available, and a first filtered reference image is available, then the method 400 may apply the first adaptive low pass filter 28 to the user image data 58, and determine whether a first filtered reference image representation matches the first filtered user image representation.

Figure 6:
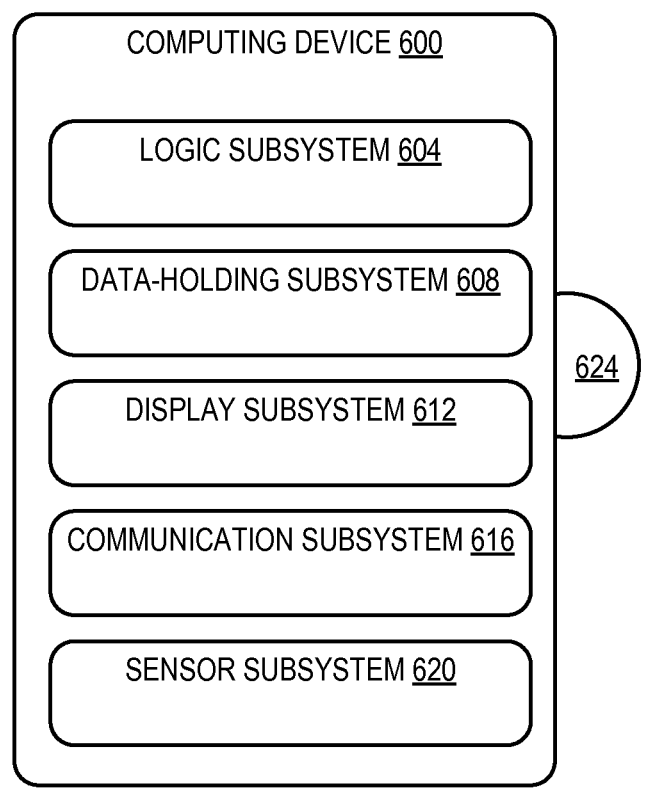
FIG. 6 is a simplified schematic illustration of an embodiment of a computing device.

FIG. 6 schematically shows an example embodiment of a computing device 600 that may perform one or more of the above described methods and processes. Computing device 600 is shown in simplified form. It is to be understood that virtually any computer architecture may be used without departing from the scope of this disclosure. In different embodiments, computing device 600 may take the form of a mainframe computer, server computer, desktop computer, laptop computer, tablet computer, home entertainment computer, network computing device, mobile computing device, mobile communication device, set-top box (e.g. cable television box, satellite television box), gaming device, etc.

As shown in FIG. 6, computing device 600 includes a logic subsystem 604, a data-holding subsystem 608, a display subsystem 612, a communication subsystem 616, and a sensor subsystem 620. Computing device 600 may optionally include other subsystems and components not shown in FIG. 6. Computing device 600 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 604 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 604 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 608 may include one or more physical, persistent devices configured to hold data and/or instructions executable by the logic subsystem 604 to implement the herein described methods and processes. When such methods and processes are implemented, the state of data-holding subsystem 608 may be transformed (e.g., to hold different data).

Data-holding subsystem 608 may include removable media and/or built-in devices. Data-holding subsystem 608 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 608 may include devices with one or more of the following characteristics: volatile, nonvolatile, dynamic, static, read/write, read-only, random access, sequential access, location addressable, file addressable, and content addressable. In some embodiments, logic subsystem 604 and data-holding subsystem 608 may be integrated into one or more common devices, such as an application specific integrated circuit or a system on a chip.

FIG. 6 also shows an aspect of the data-holding subsystem 608 in the form of removable computer-readable storage media 624, which may be used to store and/or transfer data and/or instructions executable to implement the methods and processes described herein. Removable computer-readable storage media 624 may take the form of CDs, DVDs, HD-DVDs, Blu-Ray Discs, EEPROMs, and/or floppy disks, among others.

It is to be appreciated that data-holding subsystem 608 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

Display subsystem 612 may be used to present a visual representation of data held by data-holding subsystem 608. As the above described methods and processes change the data held by the data-holding subsystem 608, and thus transform the state of the data-holding subsystem, the state of the display subsystem 612 may likewise be transformed to visually represent changes in the underlying data. The display subsystem 612 may include one or more display devices utilizing virtually any type of technology. Such display devices may be combined with logic subsystem 604 and/or data-holding subsystem 608 in a shared enclosure, or such display devices may be peripheral display devices.

Communication subsystem 616 may be configured to communicatively couple computing device 600 with one or more networks, such as network 34, and/or one or more other computing devices. Communication subsystem 616 may include wired and/or wireless communication devices compatible with one or more different communication protocols. As nonlimiting examples, the communication subsystem 616 may be configured for communication via a wireless telephone network, a wireless local area network, a wired local area network, a wireless wide area network, a wired wide area network, etc. In some embodiments, the communication subsystem may allow computing device 600 to send and/or receive messages to and/or from other devices via a network such as the Internet.

Sensor subsystem 620 may include one or more sensors configured to sense different physical phenomenon (e.g., visible light, infrared light, sound, acceleration, orientation, position, etc.) as described above. For example, the sensor subsystem 620 may comprise one or more image sensors, eye-tracking sensors, microphones, motion sensors such as accelerometers, touch pads, touch screens, and/or any other suitable sensors. Sensor subsystem 620 may be configured to provide observation information to logic subsystem 604, for example. As described above, observation information such as image data, audio information, ambient lighting information, depth information, position information, motion information, and/or any other suitable sensor data may be used to perform the methods and processes described above.

In some embodiments, sensor subsystem 620 may include a digital still camera or a video camera, such as a video camera that records color image data and/or monochrome image data. Virtually any type of image capture technology may be used without departing from the scope of this disclosure. As a non-limiting example, the digital still camera or video camera may include a charge coupled device image sensor.

In some embodiments, sensor subsystem 620 may include a depth camera. The depth camera may include left and right cameras of a stereoscopic vision system, for example. Time-resolved images from both cameras may be registered to each other and combined to yield depth-resolved video.

In other embodiments, the depth camera may be a structured light depth camera configured to project a structured infrared illumination comprising numerous, discrete features (e.g., lines or dots) onto a scene. The depth camera may be configured to image the structured illumination reflected from the scene. Based on the spacings between adjacent features in the various regions of the imaged scene, a depth image of the scene may be constructed.

In other embodiments, the depth camera may be a time-of-flight camera configured to project a pulsed infrared illumination onto the scene. The depth camera may include two cameras configured to detect the pulsed illumination reflected from the scene. Both cameras may include an electronic shutter synchronized to the pulsed illumination. The integration times for the cameras may differ, such that a pixel-resolved time-of-flight of the pulsed illumination, from the source to the scene and then to the cameras, is discernable from the relative amounts of light received in corresponding pixels of the two cameras.

The term "program" may be used to describe an aspect of the methods 300 or 400 that is implemented to perform one or more particular functions. In some cases, such a program may be instantiated via logic subsystem 604 executing instructions held by data-holding subsystem 608. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for face recognition, comprising:
receiving user image data including data representing a user face;
detecting a user luminance of the data representing the user face in the user image data;
if the user luminance is less than or equal to a first luminance threshold, then selecting a first adaptive low pass filter that provides a first attenuation of the user image data using a first cutoff frequency; and
if the user luminance is greater than the first luminance threshold and less than or equal to a second luminance threshold, then selecting a second adaptive low pass filter that provides a second attenuation of the user image data using a second cutoff frequency that is higher than the first cutoff frequency;
applying the adaptive low pass filter to the user image data to create a filtered user image;
applying feature extraction to the filtered user image to create a filtered user image representation;
from a reference image database containing a plurality of filtered reference image representations, selecting a filtered reference image representation that comprises a reference image that has been filtered with the adaptive low pass filter; and
determining whether the filtered reference image representation matches the filtered user image representation.

2. The method of claim 1, wherein the first adaptive low pass filter and the second adaptive low pass filter are averaging filters.

3. The method of claim 2, wherein the first adaptive low pass filter and the second adaptive low pass filter comprise a kernel, the first attenuation corresponds to a first kernel, the second attenuation corresponds to a second kernel, and the first kernel represents a first box pixel neighborhood that is larger than a second box pixel neighborhood represented by the second kernel.

4. The method of claim 1, wherein the first adaptive low pass filter and the second adaptive low pass filter are Gaussian filters.

5. The method of claim 4, wherein the first adaptive low pass filter and the second adaptive low pass filter comprise a kernel, the first attenuation corresponds to a first kernel having a first width, the second attenuation corresponds to a second kernel having a second width, and the first width is larger than the second width.

6. The method of claim 1, wherein if the user luminance is greater than the second luminance threshold, then:
not selecting the adaptive low pass filter;
not applying the adaptive low pass filter to the user image data to create a filtered user image;
not applying feature extraction to the filtered user image to create a filtered user image representation;
not selecting the filtered reference image representation from the reference image database;
not determining whether the filtered reference image representation matches the filtered user image representation;
applying feature extraction to an unfiltered user image comprising the data representing the user face to create an unfiltered user image representation;
from the reference image database selecting an unfiltered reference image representation; and
determining whether the unfiltered reference image representation matches the unfiltered user image representation.

7. The method of claim 1, wherein applying feature extraction to the filtered user image to create a filtered user image representation comprises reducing a number of features in the filtered user image by applying linear discriminant analysis to the filtered user image.

8. The method of claim 1, further comprising, if the filtered user image representation matches the filtered reference image representation, then authenticating an identity associated with the user image data.

9. A method for generating a reference image for face recognition, comprising:
receiving reference image data including data representing a reference face;
detecting a reference luminance of the data representing the reference face;
if the reference luminance is less than or equal to a first luminance threshold, then applying a first adaptive low pass filter to the reference image data to create a first filtered reference image;
if the reference luminance is greater than the first luminance threshold and less than or equal to a second luminance threshold, then:
applying a second adaptive low pass filter to the reference image data to create a second filtered reference image, and
applying the first adaptive low pass filter to the reference image data to create the first filtered reference image.

10. The method of claim 9, wherein the first adaptive low pass filter provides a first attenuation of the reference image data using a first cutoff frequency, and the second adaptive low pass filter provides a second attenuation of the reference image data using a second cutoff frequency that is higher than the first cutoff frequency.

11. The method of claim 10, wherein the first adaptive low pass filter and the second adaptive low pass filter are averaging filters.

12. The method of claim 11, wherein the first adaptive low pass filter comprises a first kernel that corresponds to the first attenuation, and the second adaptive low pass filter comprises a second kernel that corresponds to the second attenuation, and the first kernel represents a first box pixel neighborhood that is larger than a second box pixel neighborhood represented by the second kernel.

13. The method of claim 10, wherein the first adaptive low pass filter and the second adaptive low pass filter are Gaussian filters.

14. The method of claim 13, wherein the first adaptive low pass filter comprises a first kernel having a first width that corresponds to the first attenuation, and the second adaptive low pass filter comprises a second kernel having a second width that corresponds to the second attenuation, and the first width is larger than the second width.

15. The method of claim 9, further comprising:
where the reference luminance is greater than the first luminance threshold and less than or equal to the second luminance threshold, applying feature extraction to the first filtered reference image and the second filtered reference image to create a first filtered reference image representation and a second filtered reference image representation; and
storing the first filtered reference image representation and the second filtered reference image representation in a reference image database.

16. The method of claim 9, further comprising, if the reference luminance is greater than the second luminance threshold, then:
applying no adaptive low pass filter to the reference image data to create an unfiltered reference image;
applying the second adaptive low pass filter to the reference image data to create the second filtered reference image;
applying the first adaptive low pass filter to the reference image data to create the first filtered reference image;
applying feature extraction to the unfiltered reference image, the second filtered reference image, and the first filtered reference image to create an unfiltered reference image representation, a second filtered reference image representation, and a first filtered reference image representation; and
storing the unfiltered reference image representation, the second filtered reference image representation, and the first filtered reference image representation in a reference image database.

17. The method of claim 16, wherein applying feature extraction to the unfiltered reference image representation, the first filtered reference image, and the second filtered reference image comprises reducing a number of features in the unfiltered reference image, the first filtered reference image, and the second filtered reference image by applying linear discriminant analysis to the unfiltered reference image, the first filtered reference image, and the second filtered reference image.

18. A method for face recognition, comprising:
receiving reference image data including data representing a reference face;
detecting a reference luminance of the data representing the reference face;
applying a first adaptive low pass filter to the reference image data to create a first filtered reference image;
applying a second adaptive low pass filter to the reference image data to create a second filtered reference image;
applying feature extraction to the first filtered reference image to create a first filtered reference image representation;
applying feature extraction to the second filtered reference image to create a second filtered reference image representation;
storing the first filtered reference image representation and the second filtered reference image representation in a reference image database;
receiving user image data including data representing a user face;
detecting a user luminance of the data representing the user face in the user image data;
if the user luminance is less than or equal to a first luminance threshold, then:
applying the first adaptive low pass filter to the user image data to create a first filtered user image;
applying feature extraction to the first filtered user image to create a first filtered user image representation;
selecting from the reference image database the first filtered reference image representation; and
determining whether the first filtered reference image representation matches the first filtered user image representation;
if the user luminance is greater than the first luminance threshold and less than or equal to a second luminance threshold that is greater than the first luminance threshold, then:
applying the second adaptive low pass filter to the user image data to create a second filtered user image;
applying feature extraction to the second filtered user image to create a second filtered user image representation;
selecting from the reference image database the second filtered reference image representation; and
determining whether the second filtered reference image representation matches the second filtered user image representation.

19. The method of claim 18, further comprising, if the user luminance is greater than the second luminance threshold, then:
applying feature extraction to an unfiltered user image to create an unfiltered user image representation;
from the reference image database selecting an unfiltered reference image representation; and
determining whether the unfiltered reference image representation matches the unfiltered user image representation.

* * * * *